C. KUHLEWIND.
APPARATUS FOR MANUFACTURING GLASS ARTICLES.
APPLICATION FILED AUG. 22, 1907.
900,940.
Patented Oct. 13, 1908.
7 SHEETS—SHEET 5.
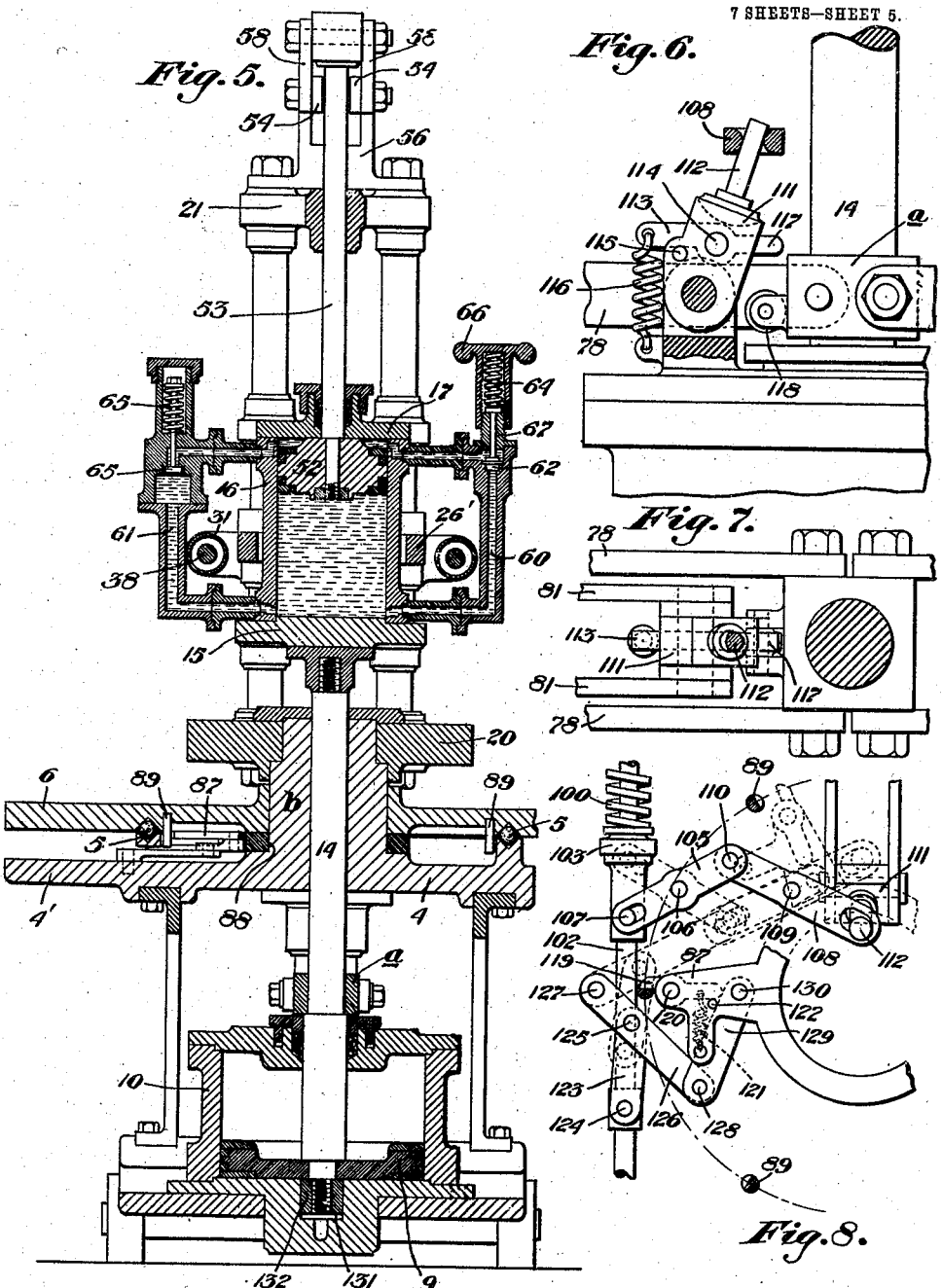

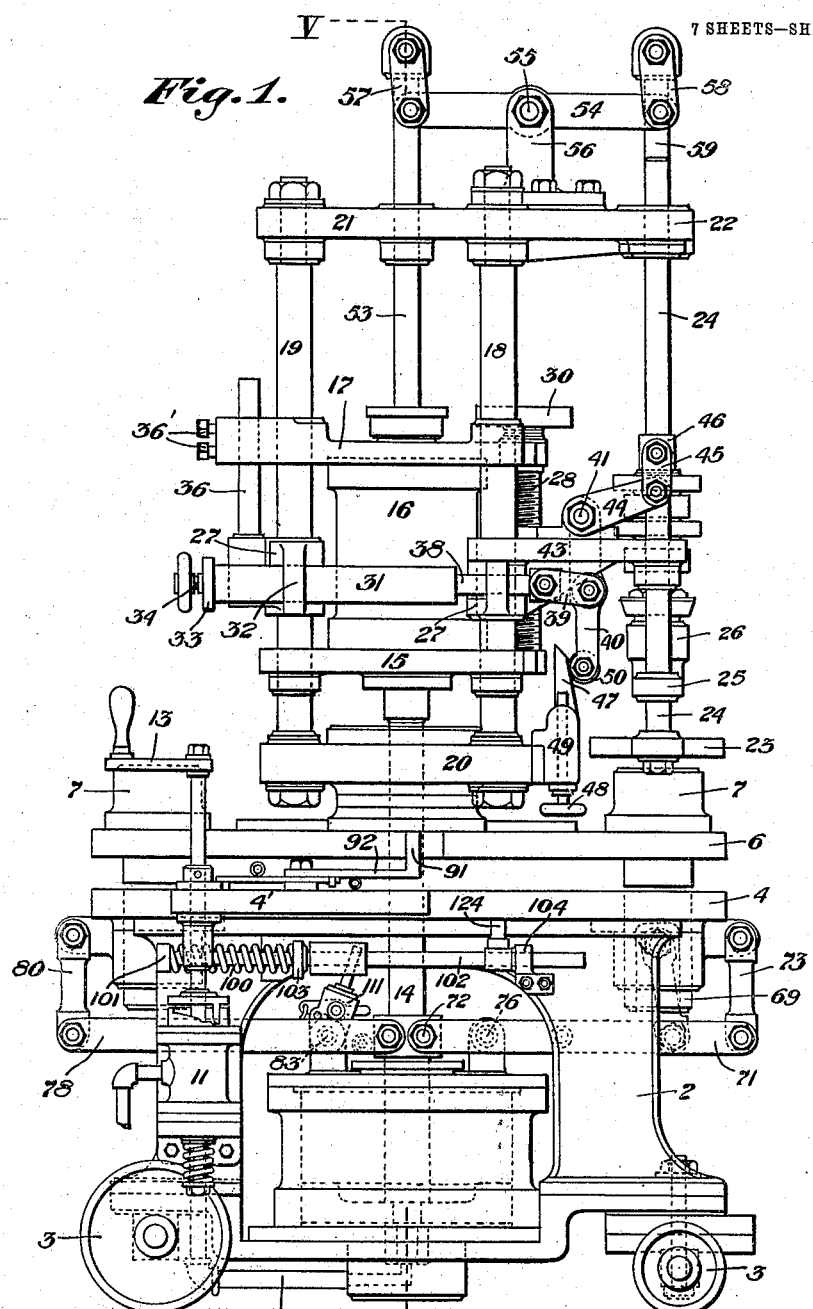

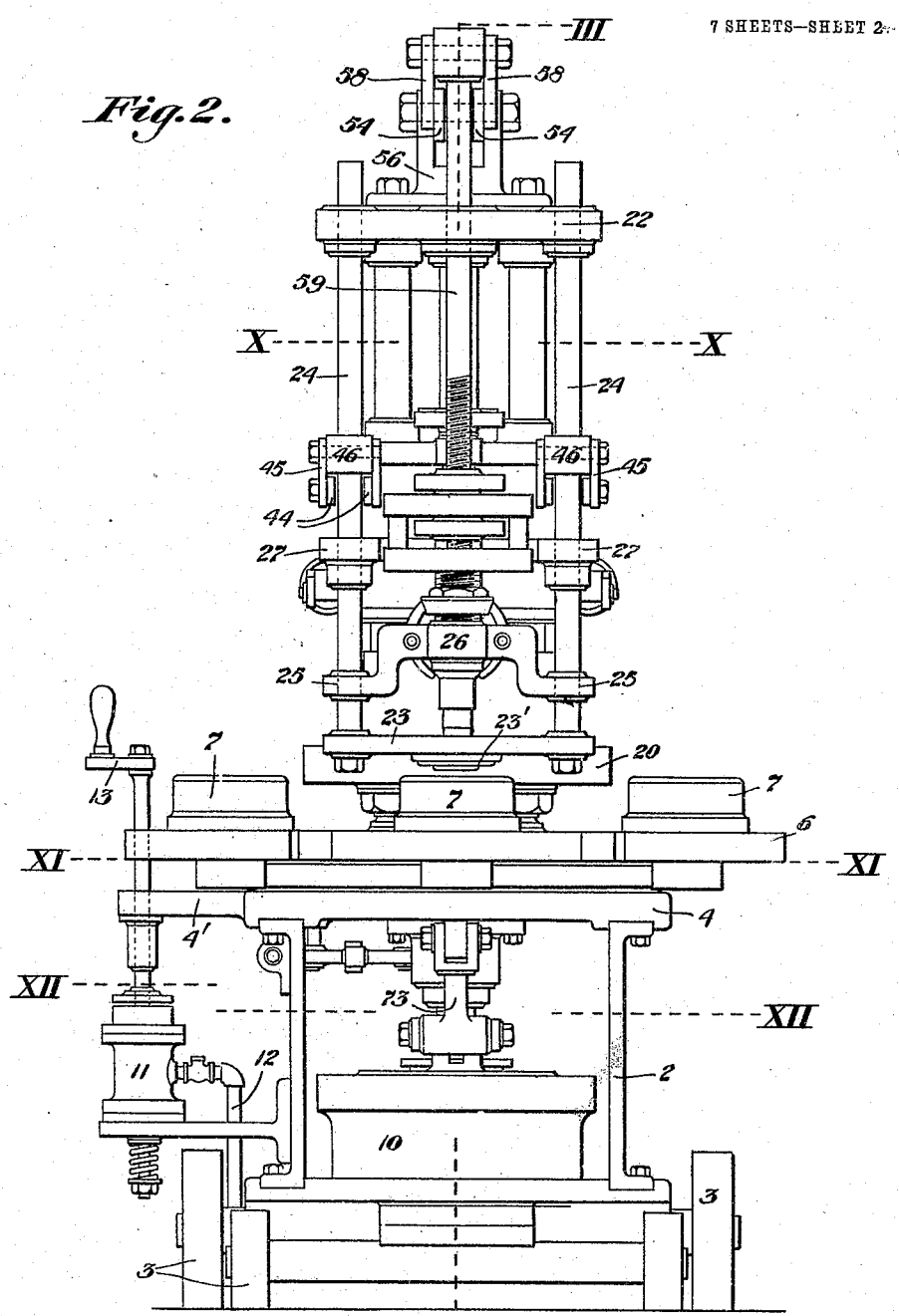

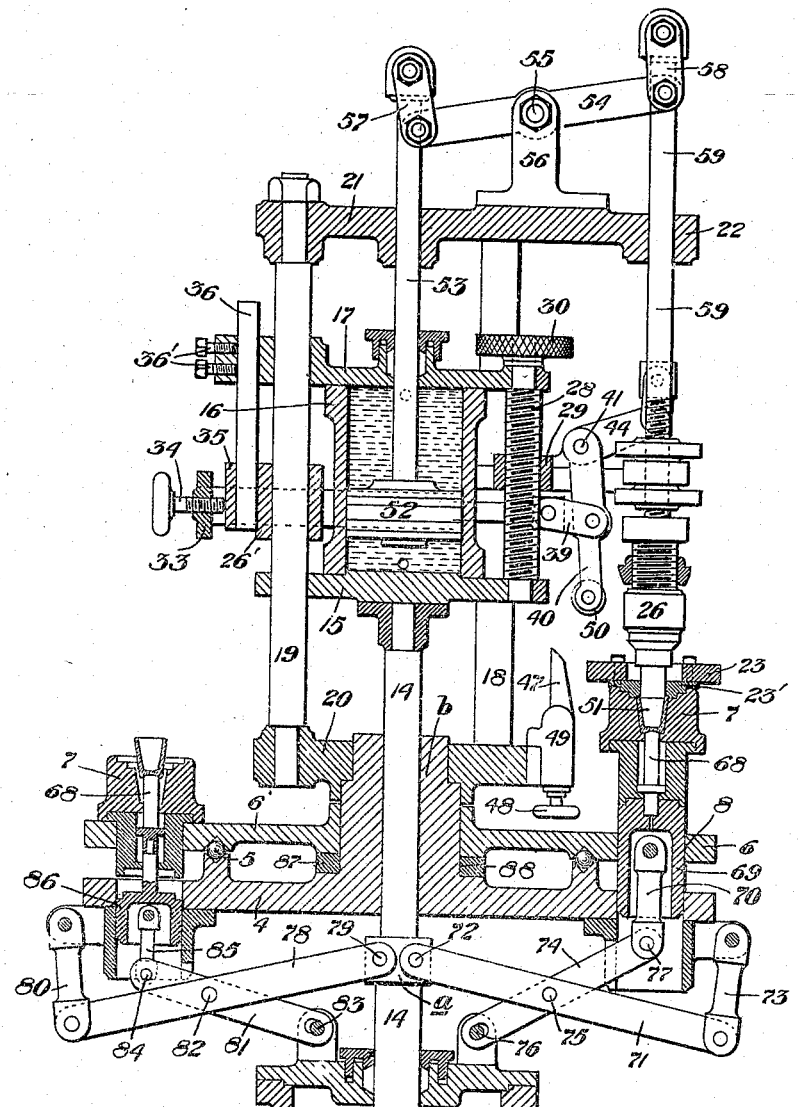

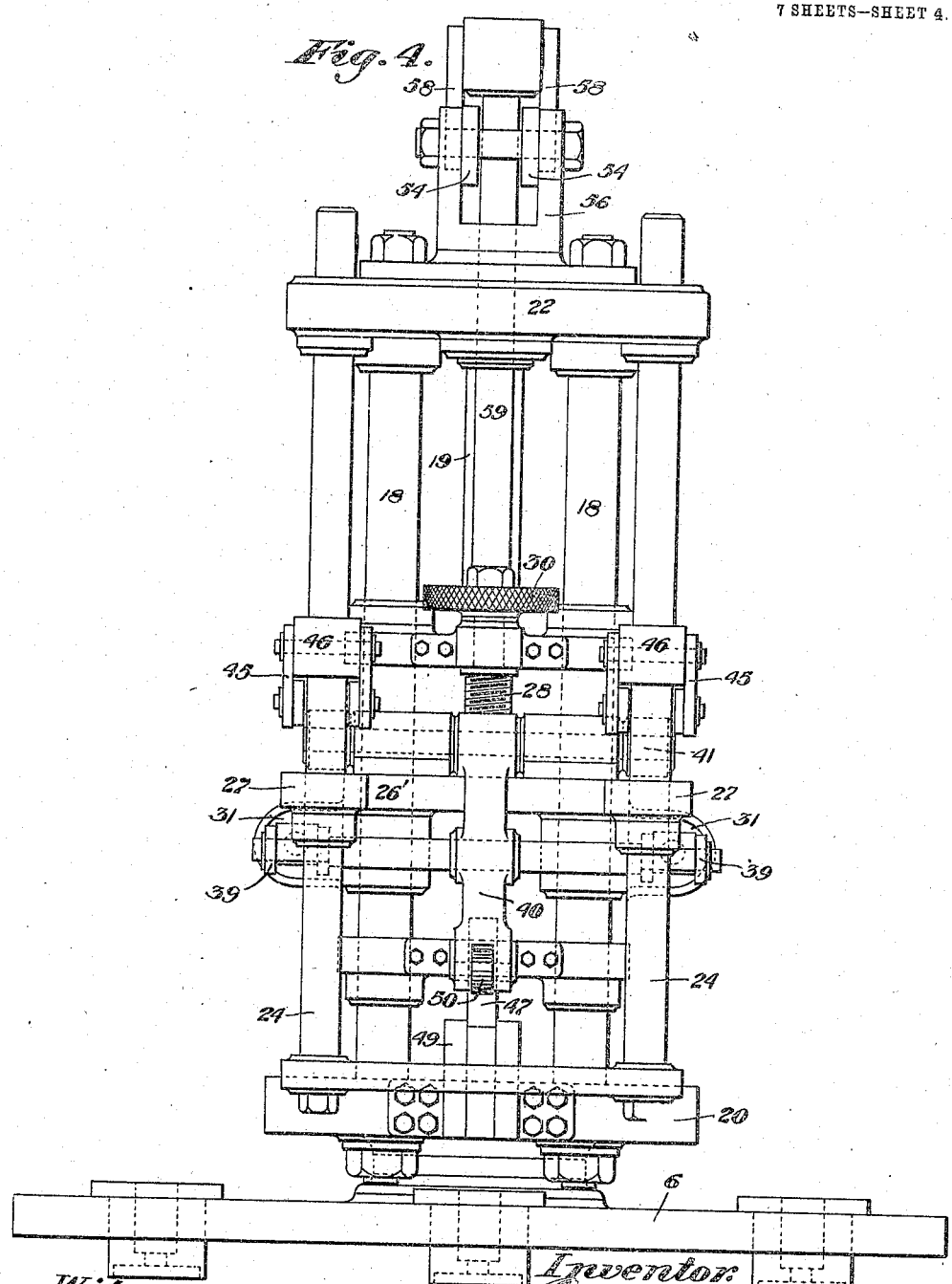

C. KUHLEWIND.
APPARATUS FOR MANUFACTURING GLASS ARTICLES.
APPLICATION FILED AUG. 22, 1907.

900,940.

Patented Oct. 13, 1908.
7 SHEETS—SHEET 6.

Witnesses:
Chas. S. Lepley
E. V. MacKenzie

Inventor:
Cornelius Kuhlewind
by C. M. Clarke
his Attorney

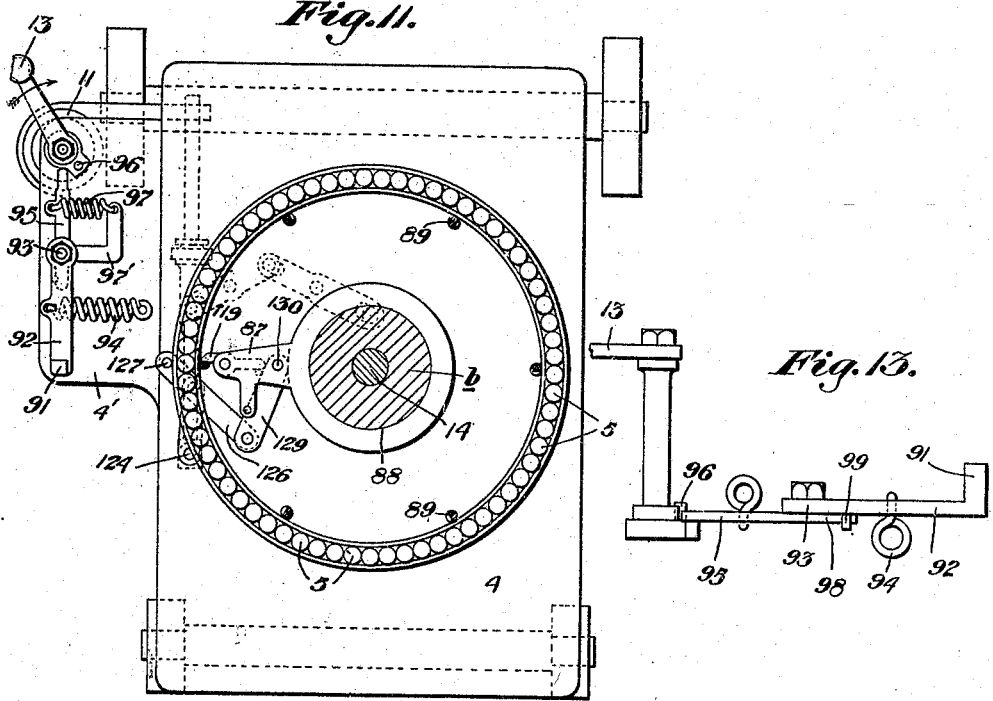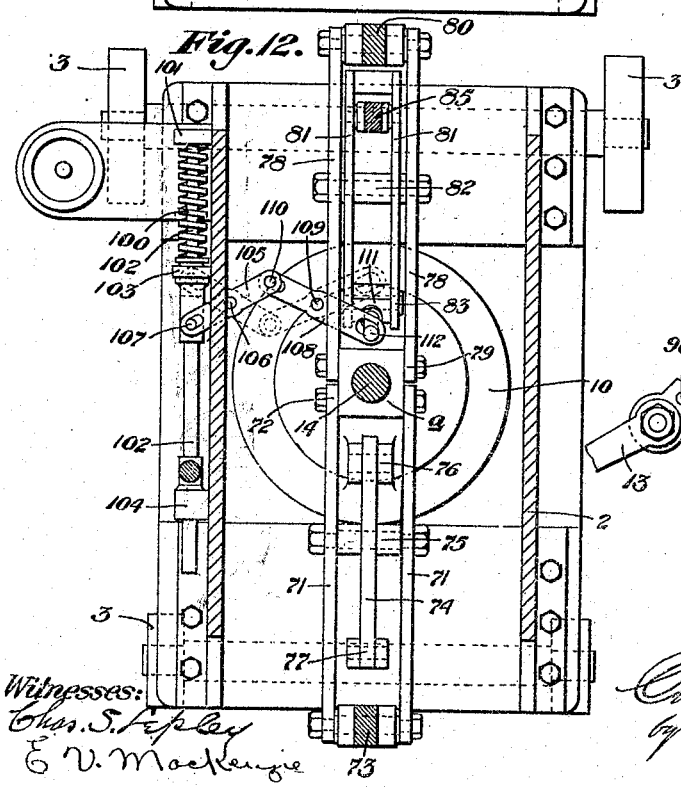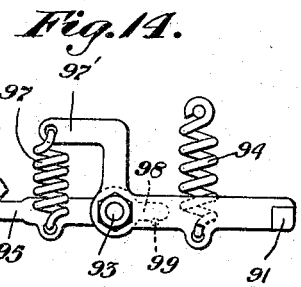

UNITED STATES PATENT OFFICE.

CORNELIUS KUHLEWIND, OF PITTSBURG, PENNSYLVANIA, ASSIGNOR OF FIVE-EIGHTHS TO PAUL WUESTHOFF, OF PITTSBURG, PENNSYLVANIA.

APPARATUS FOR MANUFACTURING GLASS ARTICLES.

No. 900,940.      Specification of Letters Patent.      Patented Oct. 13, 1908.

Application filed August 22, 1907. Serial No. 389,658.

*To all whom it may concern:*

Be it known that I, CORNELIUS KUHLEWIND, a citizen of the United States, residing at Pittsburg, in the county of Allegheny and State of Pennsylvania, have invented certain new and useful Improvements in Apparatus for Manufacturing Glass Articles, of which the following is a specification, reference being had therein to the accompanying drawing.

My invention relates to improvements in apparatus for the manufacture of articles of glassware by pressing in molds, and it has for its objects to provide a machine wherein each one of a series of molds mounted on a rotating table, is brought intermittently into register with the pressing mechanism and discharging mechanism.

The invention particularly relates to the means for actuating the working parts in such a manner that a proper pressure will be maintained upon the glass in the mold at all times and at varying positions of the mold and plunger, with means for preventing excessive pressure and allowing the plunger to recede against its own actuating force, due to lifting movement of the mold; to effect the rotation of the mold table at the proper time; to control and regulate the pressure of the working mechanism, and to various other features of improvement as shall be more fully hereinafter described.

Figure 9:
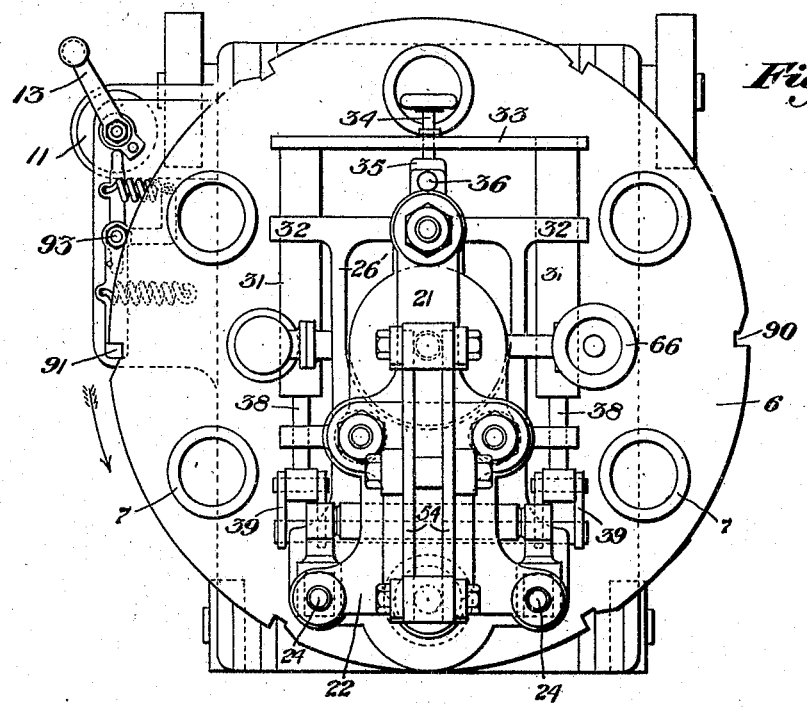
Figure 10:
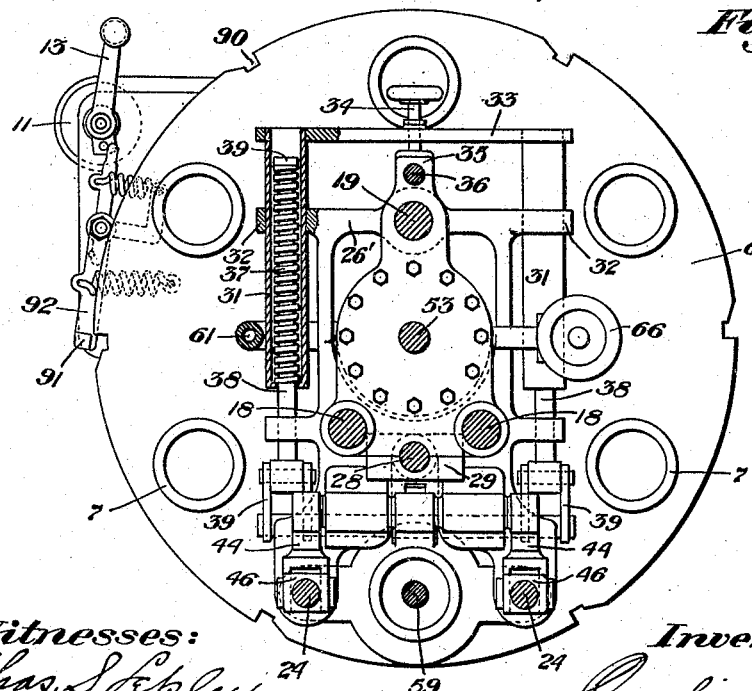

Referring to the drawings: Figure 1 is a view of the entire apparatus in side elevation, the plunger and presser plate being raised and the mold lifting mechanism being lowered. Fig. 2 is a view in front elevation of Fig. 1. Fig. 3 is a vertical sectional view on the line III. III. of Fig. 2, but illustrating the mold and its actuating mechanism raised above the rotating table with the plunger mechanism, and illustrating the ware-discharging means at the opposite side. Fig. 4 is a front elevation on an enlarged scale of the upper portion of the machine above the rotating table, the plunger mechanism having been removed. Fig. 5 is a vertical sectional view through the machine on the line V. V. of Fig. 1. Fig. 6 is an enlarged detail view illustrating the mechanism for throwing over the post of the table-rotating mechanism. Fig. 7 is a plan view of Fig. 6. Fig. 8 is a detail plan view of the mechanism for shifting the intermittently rotating table. Fig. 9 is a plan view. Fig. 10 is a horizontal sectional view on the line X. X. of Fig. 2. Figs. 11 and 12 are similar views on the line XI. XI. and XII. XII of Fig. 2. Fig. 13 is a detail view in elevation of the table locking and unlocking mechanism controlled by the operation of the valve stem. Fig. 14 is a plan view of Fig. 13.

In the drawings, 2 represents the main frame of the apparatus mounted upon the usual supporting wheels 3, provided with a stationary base 4, upon which by intervening rolling bearing balls 5, is mounted the rotatable mold-carrying table 6, the base and table being provided with suitably arranged annular grooves for the balls. The table 6 is provided with a concentrically arranged series of molds 7, six in the present machine but which may be of any number, which molds are carried in cavities 8 and are arranged for vertical movement in the operation of pressing, as shall be hereinafter described.

The present machine is designed to perform the operations of pressing and rotating by means of the original energy of a fluid actuated piston 9 mounted for vertical movement within a cylinder 10 located in the lower base portion of the machine, and to utilize the energy of a spring for rotating the table at the proper time, after the spring has been compressed by power exerted by said piston 9, and upon manipulation of the valve controlling the flow of energizing fluid to cylinder 10.

11 is the valve casing, from which by pipe 12, fluid pressure communicates to and from said cylinder, the construction of said valve not being necessarily included in the present invention, further than to state that fluid pressure is admitted to the cylinder upon manipulation of a handle 13 in the direction of the arrow in Fig. 11, and is released therefrom upon reverse movement of the lever, which is provided with mechanism hereinafter described for effecting the locking and unlocking of the rotating table at the proper time.

14 is a vertically arranged piston rod connected with piston 9 extending up through the central portion of the base 4, in which it has a sliding bearing, rod 14 being operatively connected with lower head 15 of a cylinder 16 provided with an upper head 17, both of said heads slidingly embracing stationary guide posts 18, 18, at front and 19 at the back of the machine by means of suitable gudgeons, as clearly shown in Fig. 10.

The guiding posts 18, 19, are rigidly mounted within an upper stationary base 20 secured upon the central upper projecting portions b of the base 4 as shown in Fig. 3, extending upwardly, and are rigidly connected with and supported by upper head plate 21 having a forwardly extending bearing portion 22, through which reciprocates the plunger-actuating mechanism. The said mechanism comprises a presser plate 23 and its plunger ring 23' secured to the plate is adapted to be first lowered onto the top of the mold 7 in the usual way, and which is designed to be raised by the mold against a constant pressure which increases in degree as the mold is raised, and which is accomplished by spring mechanism connected with the presser plate mechanism.

The presser plate 23 is preferably located at the lower ends of reciprocating rods 24, 24, having sliding bearings in lugs 25, 25, of the plunger head 26 of well known form, and at the top having similar bearings in plate 22. Intermediate of the presser plate 23 and bearing plate 22 is located a vertically adjustable frame 26' mounted between the cylinder heads 15, 17, and having like them, a vertical sliding engagement with posts 18 and 19 by means of bearing lugs 27. The frame 26' is vertically adjustable with relation to the cylinder by means of a temper screw 28 mounted in the heads 17 and 15 respectively, and having a threaded engagement with the front portion of the vertically adjustable frame 26' at 29, and provided with a turning head 30. By means of said temper screw 28 it will be seen that the frame 26' may be accurately adjusted vertically with relation to the cylinder 16, whereby to control the time of compression of the spring exerting the opposing pressure against the presser plate 23. Mounted in frame 26' at each side are spring-containing shells 31, horizontally adjustable in bearings 32 of frame 26' by means of cross yoke 33 and a temper screw 34 engaging the yoke and bearing forwardly against the backwardly extending bearing portion 35 of the frame. Said portion carries a vertically moving guide stud 36 having a bearing in head 17 and adapted to be secured therein by securing set screws 36' after the frame 26' is adjusted. Within the shells 31 are housed compression springs 37, through which pass rods 38 bearing by their heads or nuts thereon and suitable washers 39 against the outer ends of the springs, which in turn rest against the inner ends of the shells 31, as clearly shown in Fig. 9. Rods 38 extend forwardly through the shells and are connected at their ends by links 39 with a lever 40 secured at its upper end upon rock shaft 41 resting in bearings 42 of the forwardly extending supplemental portion 43 of the vertically adjustable frame 26. Lever 40 is keyed to rock shaft 41 and is designed to impart pressing movement downwardly through rods 24 to presser plate 23 by means of levers 44 at each side, connected by links 45 with blocks 46 secured to rod 24.

47 is a cam, vertically adjustable by means of a temper screw having a controlling wheel 48 and vertically adjustable thereby in supporting bearings 49 in front of head 20, with which cam engages a roller 50 in lower end of lever 40 when the mechanism is in its lowermost position as in Fig. 1. In such position rods 38 are drawn forward, compressing springs 37, but raising rods 24 and the presser plate 23 above the mold, due to engagement of roller 50 by cam 47. The spring 37 however will act to lower the presser plate 23 and continuously press it against the mold when the roller 50 is raised free of the cam at the commencement of the pressing operation, by reason of the inwardly drawing spring action on lever 40, throwing levers 44 and rods 24 down.

The plunger head 26 with its plunger 51 is designed to be pressed downwardly to insert the plunger in the mold by the actuating piston rod 14, operating through the resistance of the interposed cylinder 16, its contained piston 52, the piston rod 53, levers 54, 54 pivoted at 55 on standard 56 of head 21 and connected by links 57, 58 with the upper end of the plunger rod 59, also slidingly mounted in bearing portion 22 of head 21.

Cylinder 16 is filled with a suitable fluid adapted to be slowly forced from below piston 52 to the space above it and vice versa, providing resistance against the pressure in either direction. That is to say, as pressure is exerted upwardly in pressing, to force the fluid of the cylinder out of the lower cylinder cavity to the upper, and as pressure is exerted by the weight of the plunger, after the pressing operation, lifting piston 52, to force the fluid of the cylinder out of the upper cavity to the lower again.

In order to provide for a restricted flow of the fluid, I provide a by-pass port 60 at one side of the cylinder connecting its top and bottom, and a similar port 61 at the other side, through which the fluid may circulate when forced upwardly through port 60 and downwardly through port 61. Each port is closed by a valve 62 and 63 respectively seating against the pressure and opened thereby against resisting springs 64 and 65 respectively, but inoperative as to opening by fluid pressure in the opposite direction.

Spring 65 may be originally set at the desired tension to permit return flow of the fluid to the lower cylinder chamber upon fall of cylinder 16 and its connected ports and thus drawing the plunger 51 upwardly from the mold, but spring 64 is preferably graduated by means of a cap 66 having a screw engagement with the valve cover 67, as clearly shown in Fig. 5. By this construction, I provide a cushioning resistance in the confined fluid through which the pressure of the rod 14 is exerted upwardly to the plunger-actuating mechanism, and at the same time a resistance which will be overcome by the uplift of the mold, when the plunger has been projected sufficiently into the rising mold. This construction, in combination with the independent spring resistance for the pressure plate, provides for a constant maintenance of pressure downwardly against the mold, in exactly the degree desired, during the pressing operation, while entirely obviating the danger of excess pressure.

The vertically movable mold 7 with its ware-discharging stem 68 is designed to be lifted vertically above its receiving cavity 8 in table 6 by a mold raising plunger 69 actuated by pitman 70 and the compound lifting lever mechanism. Main levers 71, 71 are pivotally connected to piston rod 14 or a block a thereon at 72 and fulcrumed at the lower end of link 73 depending downwardly below the table 4, and engage the supplemental lever 74 at 75, said lever being fulcrumed at 76 above head of cylinder 10 and pivotally connected to lower end of link 70 at 77, as clearly shown in Fig. 3.

At the other side the ware-discharging stem 68 is lifted to discharge the ware by similar mechanism, consisting of main lever 78 pivotally connected with the piston rod at 79, fulcrumed in the lower end of depending link 80, pivotally engaging supplemental levers 81, 81 at 82, which levers in turn are fulcrumed at 83 and pivotally connected at 84 to a link 85 which actuates the lifting head 26 for raising the ware-discharging stem 68 of the mold, as shown at the left side of Fig. 3.

The rotation of the table is accomplished through the intermittent rotation of a laterally swinging arm 87 journaled at 88 around the central upwardly extending portion b of base 4, said arm being thrust backwardly at each lifting motion of rod 14 to engage a pin 89 of the rotating table 6, and being drawn forward to rotate the table the desired distance, (upon the table being released) by means of the stored energy of a spring which is compressed at each lifting operation of rod 14. The table of the machine is also designed to rotate upon the release of locking mechanism directly actuated by the return of the valve lever 13 to normal position. The table 6, which is designed to rotate intermittently in the direction of the arrow, Fig. 9-a, a distance equal to the space between the molds, is provided with a corresponding series of peripheral sockets or shoulders 90 into which engage the upwardly extending end 91 of a lever 92 pivotally mounted at 93 upon an extension 4' of base 4, normally held inwardly in locking position, as in Figs. 11 and 14 by spring 94 and provided with a supplemental extension 95. Said extension is designed to be engaged by a pin 96 on the inner end of valve lever 13, in one direction (when fluid pressure is supplied to cylinder 10) inoperatively, and operatively in the other direction (when fluid escapes from the cylinder) and to actuate the locking lever 92 to release when release is effected from the cylinder. For such purpose lever 95 is retracted by a spring 97 connected to arm 97' of lever 92 and bears by its opposite end 98 against a pin 99 of lever 92, so that when valve lever 13 is thrown around in the direction of the arrow to admit pressure, the pin 96 will merely ride past end of lever 95 which will then spring back to normal position. When however, the lever 13 is reversed, pin 96 will engage the other side of lever 95, throwing end 98 outwardly against pin 99 and lifting terminal 91 momentarily backwardly from the socket 90, whereupon the table will be free to rotate under the effect of spring-actuated arm 87. To actuate said arm, I provide a spring 100 bearing backwardly against abutment 101 and surrounding stem 102, which stem reciprocates at each movement of the machine and compresses the spring 100 by a flange 103, the rod 102 extending forwardly through sliding bearing 104.

105 is a lever pivoted at 106 underneath the base 4 and pivotally engaging rod 102 at 107, while a similar lever 108 is pivoted at 109 and is pivotally connected with said lever 105 at 110. Both levers, and consequently rod 102, are actuated to compress spring 100 when piston rod 14 rises, by the following means. 111 is a tilting block pivoted at 83 in the same bearings as levers 81 and provided with an upwardly extending stem 112 engaging the slotted end of lever 108, while the tilting block is also provided with a trigger 113 pivoted at 114, having one end held down against a stop 115 by spring 116. The other end 117 of the trigger is located in the upward path of a roller 118 mounted on block a of piston rod 14 whereby the block 111 will be tilted over when the roller rises, but the trigger will trip down inoperatively when the roller falls.

The operation of tripping the block 111 is to actuate levers 108 and 105, throwing back rod 102 and compressing the spring, and at the same time throwing arm 87 around to engage the next pin 89 of the table. This throwing and engagement is done by a finger 119 pivoted at 120 and retracted by spring 121 against abutment 122, whereby the finger may freely slip backwardly past the pin 89 but will engage it on forward travel.

Arm 87 is actuated from rod 102 backwardly to the pin-engaging position (dotted lines Figs. 8 and 11) simultaneously with the spring compression, by means of link 123 pivoted at 124 to rod or stud on 102 and at 125 to lever 126 fulcrumed at 127 and pivoted at 128 to link 129 which in turn is pivotally connected at 130 to arm 87. Therefore, as rod 102 is thrown back by levers 108 and 105 upon piston rod 14 rising and actuating tilting block 111, the shifting arm 87 is thrown around, engaging the next pin 89 of the table, the actuating spring 100 is compressed, and when lever 13 is turned to release fluid from cylinder 10, pin 91 unlocks the table, allowing spring 100 to exert its pressure and to automatically rotate it to the next position, where it is automatically locked by the next shoulder socket 90 becoming engaged.

It will thus be seen that every movement is completely automatic and is effected, for one complete operation, by the mere operation of the valve stem by lever 13.

A feature of importance is that the initial movement of the mold raising and plunger actuating mechanism is comparatively slow, and is accomplished by recessing the lower head of cylinder 10 as at 131 and providing the piston with a supplemental piston extension 132 fitting therein, and of comparatively small diameter. By this construction, the fluid pressure is first exerted under piston extension 132, lifting the piston very slowly until the extension emerges from the diminutive cylinder 131, whereupon the full area of piston 9 will receive the pressure and will accomplish its further travel and the subsequent operations at greater speed and with corresponding pressure.

The operation will be understood from the foregoing description. It will be seen that all of the movements of the machine are automatic and controlled by the manipulation of the valve lever 13, and that the various operations are interdependent and consecutive. The pressing of the ware is rendered very accurate and regular, resulting in great uniformity and accuracy of output.

What I claim is:

1. In a glass press, the combination of a vertically rising mold, a lowering plunger and actuating mechanism therefor, a lowering spring plate, spring retracted lever mechanism operatively connected with the spring plate, and a stationary cam arranged to engage a portion of said lever mechanism, substantially as set forth.

2. In a glass press, the combination of a vertically rising mold, a lowering plunger and actuating mechanism therefor with interposed circulating fluid resistance, and a lowering spring plate provided with independent actuating mechanism embodying resisting mechanism.

3. In a glass press, the combination of a vertically rising mold, a lowering plunger and actuating mechanism therefor embodying a circulating fluid providing resisting means, and a lowering spring plate provided with independent actuating mechanism embodying resisting mechanism.

4. The combination with a base and a rotating mold table provided with a series of molds, of means for lifting the molds singly, a plunger and actuating means therefor embodying a circulating fluid providing yielding resistance, a presser plate and independent actuating means therefor embodying yielding resistance, and a motor for actuating said means.

5. The combination with a base and a rotating mold table provided with a series of molds, of means for lifting the molds singly, a plunger and actuating means therefor embodying yielding circulating fluid resistance, a presser plate and independent actuating means therefor embodying yielding resistance, means for discharging the ware, and a motor for actuating said means.

6. The combination with a base and a rotating mold table provided with a series of molds, of means for lifting the molds singly, a plunger and actuating means therefor embodying a circulating fluid providing yielding resistance, means for rotating the table, and a motor for actuating said means.

7. In a glass press, the combination with a mold, of plunger mechanism, a vertically movable rod and a motor therefor, a relatively movable rod in alinement with said rod, an interposed cylinder and piston, and lever mechanism connecting the relatively movable rod with the plunger mechanism.

8. In a glass press, the combination with a mold, of plunger mechanism, a vertically movable rod and a motor therefor, a relatively movable rod in alinement with said rod, an interposed cylinder and plunger, valve-controlled ports providing for restricted fluid circulation in said cylinder, and lever mechanism connecting the relatively movable rod with the plunger mechanism.

9. In combination with the lower and upper actuating rods of the plunger mechanism, means for providing yielding resistance between said rods consisting of a cylinder connected with one of said rods, a plunger head connected with the other rod and operable in said cylinder, and valve-controlled by-pass ports connecting the opposite ends of the cylinder.

10. In combination with the lower and upper actuating rods of the plunger mechanism, means for providing yielding resistance between said rods consisting of a cylinder connected with one of said rods, a plunger head connected with the other rod and operable in said cylinder, and valve-controlled by-pass ports connecting the opposite ends of the cylinder, with springs opposing said valves.

11. In combination with the lower and upper actuating rods of the plunger mechanism consisting of a cylinder connected with one of said rods, a plunger head connected with the other rod and operable in said cylinder, a valve-controlled by-pass port connecting the opposite ends of the cylinder, and an adjustable-pressure spring opposing said valve.

12. In a glass press provided with a rotating table and a fluid-actuated plunger-operating motor, and locking mechanism for the table; the combination with the motor and locking mechanism, of a controlling valve having an element adapted to actuate the locking mechanism.

13. In a glass press provided with a rotating table and a fluid-actuated plunger-operating motor, and locking mechanism for the table; the combination with the motor and locking mechanism, of a controlling valve having an element adapted to actuate the locking mechanism, and means for rotating the table.

14. Means for rotating the table consisting of a swinging arm arranged to engage the table, a spring, means for compressing the spring, and means whereby the expansion of the spring actuates the swinging arm.

15. Locking and unlocking mechanism for the table consisting of a spring-controlled locking arm provided with a supplemental spring-controlled arm operable in one direction, and a device adapted to inoperatively engage the supplemental arm in one direction and operatively in the other.

16. Locking and unlocking mechanism for the table consisting of a spring-controlled locking arm provided with a supplemental spring-controlled arm operable in one direction, and a valve-controlling lever having an abutment adapted to engage the supplemental arm.

17. The combination with the presser plate and its rods, of lever mechanism therefor, spring devices exerting pressure thereon, and a cam arranged to engage the lever mechanism.

18. The combination with the presser plate and its rods, of lever mechanism therefor, a spring, a spring housing and means for locating it, a rod engaging the spring and connected to the lever mechanism, and a cam arranged to engage the lever mechanism.

19. The combination with the presser plate, and its rods, of lever mechanism therefor, spring devices exerting pressure thereon, and a cam arranged to engage the lever mechanism, with means for adjusting the cam.

In testimony whereof I affix my signature in presence of two witnesses.

CORNELIUS KUHLEWIND.

Witnesses:
C. M. CLARKE,
CHAS. S. LEPLEY.